US012741670B2

(12) United States Patent
Urano et al.

(10) Patent No.: US 12,741,670 B2
(45) Date of Patent: Sep. 22, 2026

(54) AUTOMATED DRIVING SYSTEM

(71) Applicant: TOYOTA JIDOSHA KABUSHIKI KAISHA, Toyota (JP)

(72) Inventors: Hiromitsu Urano, Numazu (JP); Masamichi Ohsugi, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 125 days.

(21) Appl. No.: 18/753,544

(22) Filed: Jun. 25, 2024

(65) Prior Publication Data

US 2025/0002037 A1 Jan. 2, 2025

(30) Foreign Application Priority Data

Jun. 27, 2023 (JP) ................................ 2023-105229

(51) Int. Cl.
*G07C 5/00* (2006.01)
*B60W 50/00* (2006.01)
*B60W 60/00* (2020.01)
*G06N 20/00* (2019.01)

(52) U.S. Cl.
CPC .......... *B60W 60/001* (2020.02); *B60W 50/00* (2013.01); *G06N 20/00* (2019.01); *B60W 2050/0005* (2013.01); *B60W 2556/45* (2020.02)

(58) Field of Classification Search
CPC ............... B60W 60/001; B60W 50/00; B60W 2050/0005; B60W 2556/45; G06N 20/00; G06N 3/08; G07C 5/008; G07C 5/0841
See application file for complete search history.

(56) References Cited

U.S. PATENT DOCUMENTS

| | | | | |
|---|---|---|---|---|
| 2003/0046001 | A1 | 3/2003 | Todoriki | |
| 2008/0195310 | A1 | 8/2008 | Yamada | |
| 2020/0043254 | A1 | 2/2020 | Hase et al. | |
| 2020/0302233 | A1 | 9/2020 | Iwasaki | |
| 2021/0407220 | A1 | 12/2021 | Fang et al. | |
| 2023/0119474 | A1 | 4/2023 | Yamaoka et al. | |
| 2025/0201119 | A1* | 6/2025 | De Vallois | G08G 1/0129 |

FOREIGN PATENT DOCUMENTS

| | | | |
|---|---|---|---|
| JP | 2003-075183 | A | 3/2003 |
| JP | 2008-197015 | A | 8/2008 |
| JP | 2018-039369 | A | 3/2018 |
| WO | 2019/116423 | A1 | 6/2019 |

* cited by examiner

*Primary Examiner* — Ramya P Burgess
*Assistant Examiner* — Chanmin Park
(74) *Attorney, Agent, or Firm* — Dinsmore & Shohl LLP

(57) ABSTRACT

An automated driving system installed on a vehicle includes one or more processors and one or more storage devices. The one or more processors perform at least a part of automated driving control of the vehicle by using a machine learning model. During execution of the automated driving control, the one or more processors acquire target data including log data related to the automated driving control that uses the machine learning model. The target data of a target storage amount are stored in the one or more storage devices per unit time or unit distance. At an upload position, at least a part of the target data stored in the one or more storage devices is uploaded to an external device. The target storage amount includes a first storage amount that increases as a remaining distance or a remaining time to the upload position decreases.

7 Claims, 6 Drawing Sheets

AUTOMATED DRIVING CONTROL UNIT
10
SENSOR GROUP
11
RECOGNITION SENSOR
12
STATE SENSOR
13
POSITION SENSOR
SEN
SEN
20
RECOGNITION UNIT
RES
30
PLANNING UNIT
TRJ
40
CONTROL AMOUNT CALCULATION UNIT
CON
50
TRAVEL DEVICE
51
STEERING DEVICE
52
DRIVING DEVICE
53
BRAKING DEVICE
1

MANAGEMENT SERVER
200
220
1
1
1
AUTOMATED DRIVING SYSTEM
100
PROCESSOR
110
STORAGE DEVICE
120
PROGRAM
130
MODEL DATA
140
LOG DATA
LOG

AUTOMATED DRIVING SYSTEM

CROSS-REFERENCES TO RELATED APPLICATION

The present disclosure claims priority to Japanese Patent Application No. 2023-105229, filed on Jun. 27, 2023, the contents of which application are incorporated herein by reference in their entirety.

TECHNICAL FIELD

The present disclosure relates to an automated driving system installed on a vehicle.

BACKGROUND ART

A technique of performing automated driving control of a vehicle by using a machine learning model is known. Patent Literature 1 (WO2019/116423) discloses a method for collecting training data that can be used for training of a machine learning model.

LIST OF RELATED ART

Patent Literature 1: International Publication WO 2019/116423

SUMMARY

As a method for ex-post facto assessment of automated driving control of a vehicle, it is conceivable to store log data related to the automated driving control in an in-vehicle storage device. However, a capacity of the in-vehicle storage device is limited. It is thus desirable to avoid such a situation where even minimum required log data cannot be stored.

An object of the present disclosure is to provide a technique capable of appropriately storing log data related to automated driving control.

An aspect of the present disclosure is directed to an automated driving system installed on a vehicle.

The automated driving system includes one or more processors and one or more storage devices.

The one or more processors perform at least a part of automated driving control of the vehicle by using a machine learning model.

During execution of the automated driving control, the one or more processors acquire target data including log data related to the automated driving control that uses the machine learning model.

The one or more processors store the target data of a target storage amount in the one or more storage devices per unit time or unit distance.

An upload position is a position where at least a part of the target data stored in the one or more storage devices is uploaded to an external device.

The target storage amount includes a first storage amount that increases as a remaining distance or a remaining time to the upload position decreases.

The target storage amount per unit time or unit distance includes the first storage amount. The first storage amount increases as the remaining distance or the remaining time to the upload position decreases. At an early stage where the remaining distance or the remaining time is long, the first storage amount is set to be small (moderate). This can suppress such a situation where the free space on the storage device is depleted at the early stage. That is to say, it is possible to suppress such a situation where necessary log data cannot be stored in the storage device.

On the other hand, as the remaining distance or the remaining time to the upload position decreases, the first storage amount increases and thus the target data stored in the storage device becomes richer. This makes it possible to store more useful data. That is to say, it is possible to effectively utilize the capacity of the storage device.

As described above, according to the present disclosure, it is possible to appropriately store the log data related to the automated driving control while effectively utilizing the capacity of the storage device.

DETAILED DESCRIPTION

1. Automated Driving of Vehicle

Figure 1:
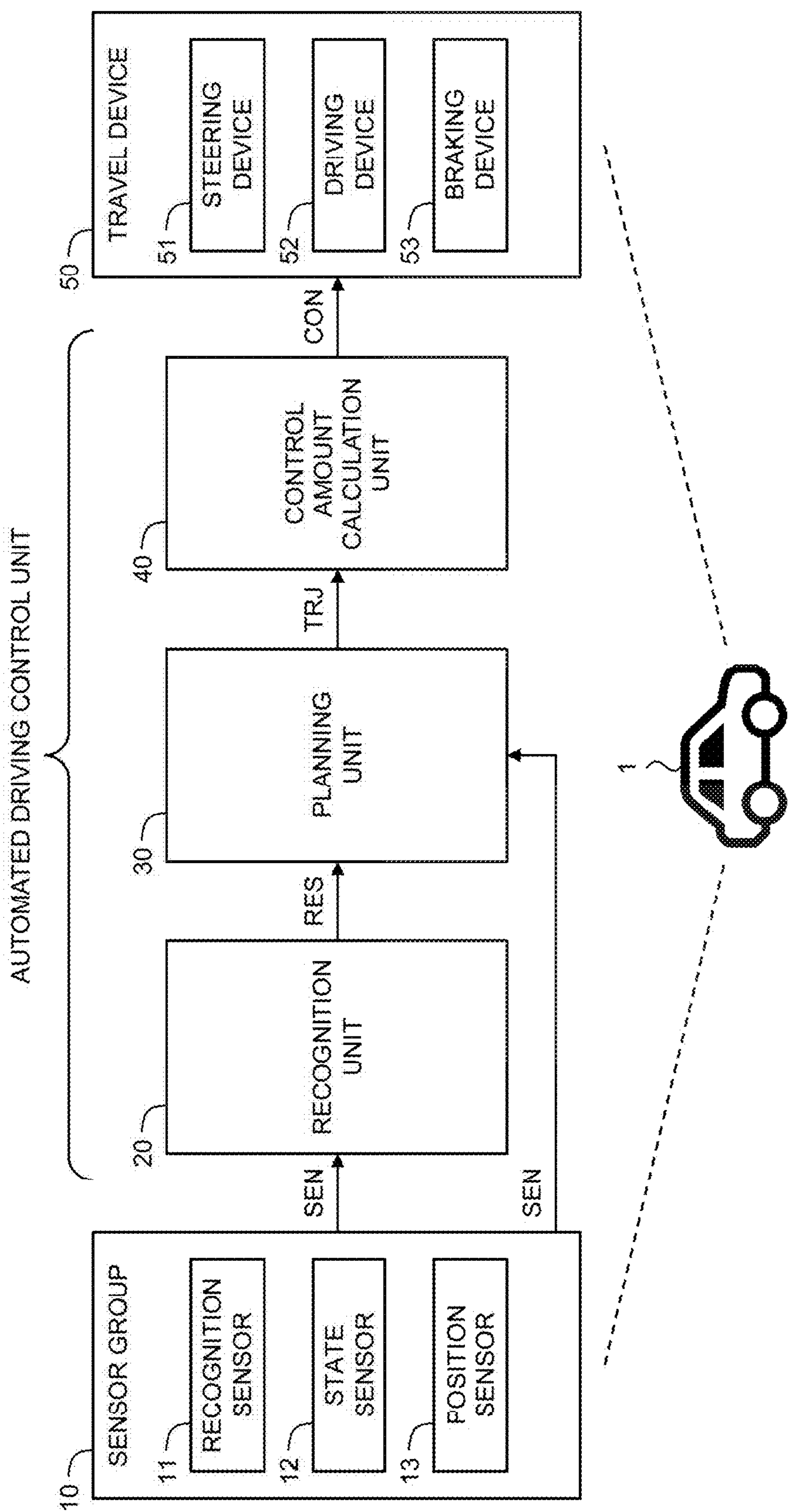
FIG. 1 is a block diagram showing an example of a configuration related to automated driving control of a vehicle according to an embodiment.

FIG. 1 is a block diagram showing an example of a configuration related to automated driving control of a vehicle 1 according to the present embodiment. The automated driving is to automatically perform at least one of steering, acceleration, and deceleration of the vehicle 1 without depending on a driving operation performed by an operator. The automated driving control is a concept including not only complete automated driving control but also risk avoidance control, lane keep assist control, and the like. The operator may be a driver on board the vehicle 1 or may be a remote operator who remotely operates the vehicle 1.

The vehicle 1 includes a sensor group 10, a recognition unit 20, a planning unit 30, a control amount calculation unit 40, and a travel device 50.

The sensor group 10 includes a recognition sensor 11 used for recognizing a situation around the vehicle 1. Examples of the recognition sensor 11 include a camera, a laser imaging detection and ranging (LIDAR), a radar, and the like. The sensor group 10 may further include a state sensor 12 that detects a state of the vehicle 1, a position sensor 13 that detects a position of the vehicle 1, and the like. Examples of the state sensor 12 include a speed sensor, an acceleration sensor, a yaw rate sensor, a steering angle sensor, and the like. As the position sensor 13, a global navigation satellite system (GNSS) sensor is exemplified.

Sensor detection information SEN is information acquired by the use of the sensor group 10. For example, the sensor detection information SEN includes an image captured (taken) by the camera. As another example, the sensor detection information SEN may include point group information acquired by the LIDAR. The sensor detection information SEN may include vehicle state information indicating the state of the vehicle 1. The sensor detection information SEN may include position information indicating the position of the vehicle 1.

The recognition unit 20 receives the sensor detection information SEN. The recognition unit 20 recognizes a situation around the vehicle 1 based on the information acquired by the recognition sensor 11. For example, the recognition unit 20 recognizes an object around the vehicle 1. Examples of the object include a pedestrian, another vehicle (e.g., a preceding vehicle, a parked vehicle, and the like), a white line, a road structure (e.g., a guard rail, a curb, and the like), a fallen object, a traffic light, an intersection, a sign, and the like. Recognition result information RES indicates a result of recognition by the recognition unit 20. For example, the recognition result information RES includes object information indicating a relative position and a relative speed of the object with respect to the vehicle 1.

The planning unit (planner) 30 receives the recognition result information RES from the recognition unit 20. In addition, the planning unit 30 may receive the vehicle state information, the position information, and map information generated in advance. The map information may be high-precision three dimensional map information. The planning unit 30 generates a travel plan of the vehicle 1 based on the received information. The travel plan may be one for arriving at a destination set in advance. The travel plan my be one for avoiding a risk. Examples of the travel plan include maintaining a current travel lane, making a lane change, overtaking, making a right or left turn, steering, accelerating, decelerating, stopping, and the like. Further, the planning unit 30 generates a target trajectory TRJ required for the vehicle 1 to travel in accordance with the travel plan. The target trajectory TRJ includes a target position and a target velocity.

The control amount calculation unit 40 receives the target trajectory TRJ from the planning unit 30. The control amount calculation unit 40 calculates a control amount CON required for the vehicle 1 to follow the target trajectory TRJ. It can be also said that the control amount CON is a control amount required for reducing a deviation of the vehicle 1 from the target trajectory TRJ. The control amount CON includes at least one of a steering control amount, a driving control amount, and a braking control amount. Examples of the steering control amount include a target steering angle, a target steering torque, a target motor angle, a target motor drive current, and the like. Examples of the driving control amount include a target speed, a target acceleration, and the like. Examples of the braking control amount include a target speed, a target deceleration, and the like.

The travel device 50 includes a steering device 51, a driving device 52, and a braking device 53. The steering device 51 steers wheels of the vehicle 1. For example, the steering device 51 includes an electric power steering (EPS) device. The driving device 52 is a power source that generates a driving force. Examples of the driving device 52 include an engine, an electric motor, an in-wheel motor, and the like. The braking device 53 generates a braking force. The travel device 50 receives the control amount CON from the control amount calculation unit 40. The travel device 50 operates the steering device 51, the driving device 52, and the braking device 53 in accordance with the steering control amount, the driving control amount, and the braking control amount, respectively. Thus, the vehicle 1 travels so as to follow the target trajectory TRJ.

The recognition unit 20 includes at least one of a rule-based model and a machine learning model. The rule-based model performs the recognition process based on a predetermined rule group. Examples of the machine learning model include a neural network (NN), a support vector machine (SVM), a regression model, a decision tree model, and the like. The NN may be a convolutional neural network (CNN), a recurrent neural network (RNN), or a combination of CNN and RNN. The type of each layer, the number of layers, and the number of nodes in the NN are arbitrary. The machine learning model is generated in advance through machine learning. The recognition unit 20 performs the recognition process by inputting the sensor detection information SEN into the model. The recognition result information RES is output from the model or generated based on the output from the model.

Similarly, the planning unit 30 also includes at least one of a rule-based model and a machine learning model. The planning unit 30 performs the planning process by inputting the recognition result information RES into the model. The target trajectory TRJ is output from the model or generated based on the output from the model.

Similarly, the control amount calculation unit 40 also includes at least one of a rule-based model and a machine learning model. The control amount calculation unit 40 performs the control amount calculation process by inputting the target trajectory TRJ into the model. The control amount CON is output from the model or generated based on the output from the model.

Two or more of the recognition unit 20, the planning unit 30, and the control amount calculation unit 40 may have an integrated architecture. All of the recognition unit 20, the planning unit 30, and the control amount calculation unit 40 may have an integrated architecture (End-to-End architecture). For example, the recognition unit 20 and the planning unit 30 may have an integrated architecture that generates and outputs the target trajectory TRJ directly from the sensor detection information SEN. Even in the case of the integrated architecture, intermediate products such as the recognition result information RES and the target trajectory TRJ may be output. For example, in a case where the recognition unit 20 and the planning unit 30 have an integrated architecture based on a NN, the recognition result information RES may be an output from an intermediate layer of the NN.

The recognition unit 20, the planning unit 30, and the control amount calculation unit 40 constitute an "automated driving control unit" that controls the automated driving of the vehicle 1. In the present embodiment, a machine learning model is used for at least a part of the automated driving control unit. In other words, at least one of the recognition unit 20, the planning unit 30, and the control amount calculation unit 40 includes the machine learning model. The automated driving control unit performs at least a part of the automated driving control of the vehicle 1 by using the machine learning model.

Figure 2:
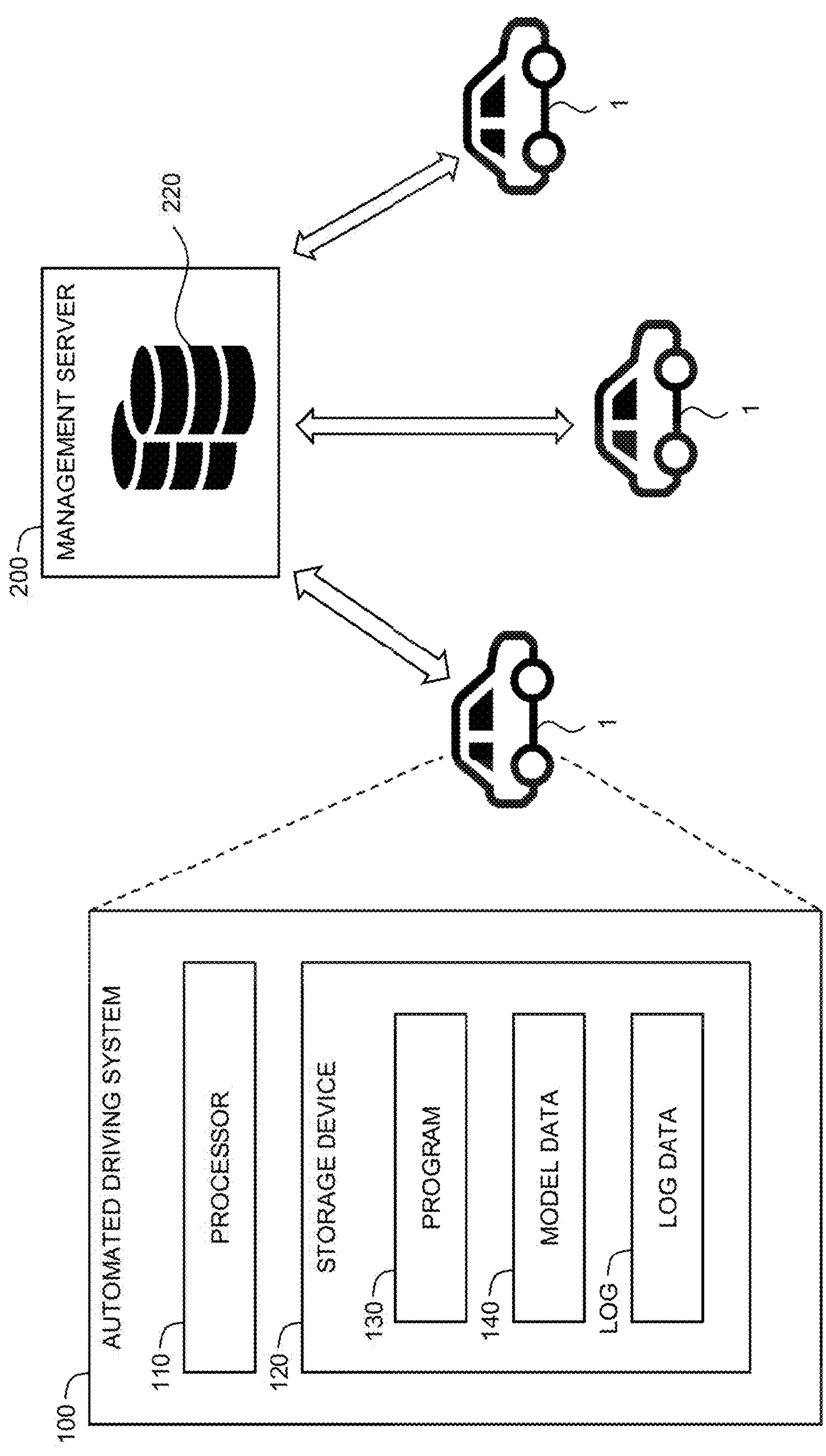
FIG. 2 is a conceptual diagram showing an example of a configuration of an automated driving system according to an embodiment.

FIG. 2 is a conceptual diagram showing an example of a configuration of an automated driving system 100 according to the present embodiment. The automated driving system 100 is installed on the vehicle 1 and performs the automated driving control of the vehicle 1. The automated driving system 100 has at least the function of the automated driving control unit described above. The automated driving system 100 may further include the sensor group 10 and the travel device 50.

The automated driving system 100 includes one or more processors 110 (hereinafter, simply referred to as a processor 110 or processing circuitry) and one or more storage devices 120 (hereinafter, simply referred to as a storage device 120).

The processor 110 executes a variety of processing. Examples of the processor 110 include a central processing unit (CPU), a graphics processing unit (GPU), an application specific integrated circuit (ASIC), a field-programmable gate array (FPGA), and the like. The recognition unit 20, the planning unit 30, and the control amount calculation unit 40 may be implemented by a single processor 110 or may be respectively implemented by separate processors 110. The storage device 120 stores a variety of information. Examples of the storage device 120 include a hard disk drive (HDD), a solid state drive (SSD), a volatile memory, a non-volatile memory, and the likes.

A program 130 is a computer program for controlling the vehicle 1, and is executed by the processor 110. The variety of processing by the automated driving system 100 may be implemented by a cooperation of the processor 110 executing the program 130 and the storage device 120. The program 130 is stored in the storage device 120. The program 130 may be recorded on a non-transitory computer-readable recording medium.

Model data 140 include data of the models included in the recognition unit 20, the planning unit 30, and the control amount calculation unit 40. As described above, in the present embodiment, at least one of the recognition unit 20, the planning unit 30, and the control amount calculation unit 40 includes the “machine learning model.” The model data 140 are stored in the storage device 120 and used for the automated driving control.

During execution of the automated driving control, the processor 110 acquires “log data LOG” related to the automated driving control that uses the machine learning model. For example, the log data LOG are used for assessment and the like of the automated driving control that uses the machine learning model. The log data LOG may include the sensor detection information SEN that is input to the automated driving control unit. The log data LOG may include the control amount CON that is output from the automated driving control unit. The log data LOG may include the recognition result information RES that is output from the recognition unit 20. The log data LOG may include the target trajectory TRJ that is output from the planning unit 30. The log data LOG may include a reason for determination in the recognition process performed by the recognition unit 20. The log data LOG may include a reason for determination in the planning process performed by the planning unit 30. The log data LOG may include presence or absence of an operator’s intervention in the automated driving control.

The processor 110 stores the log data LOG acquired during the execution of the automated driving control in the storage device 120. The processor 110 may temporarily store the log data LOG in the storage device 120 for a certain period of time.

A management server 200 is an external device that is present outside the vehicle 1. The management server 200 communicates with one or more vehicles 1 via a communication network. During execution of the automated driving control or after the automated driving control is terminated, the processor 110 of the vehicle 1 may upload at least a part of the log data LOG stored in the local storage device 120 to the management server 200. The processor 110 may delete the log data LOG uploaded to the management server 200 from the local storage device 120.

The management server 200 is provided with a database 220. The management server 200 acquires the log data LOG that are uploaded from one or more vehicles 1. Then, the management server 200 stores (retains) the acquired log data LOG in the database 220. The management server 200 stores (retains) the log data LOG at least for a predetermined period of time. For example, the log data LOG are used for assessment and the like of the automated driving control that uses the machine learning model.

2. Efficient Storing of Log Data

In the following description, upload target data DUP mean data being a target to be uploaded from the vehicle 1 to the management server 200. The upload target data DUP include at least the log data LOG related to the automated driving control that uses the machine learning model. The upload target data DUP may further include data that are not directly related to the automated driving control.

Figure 3:
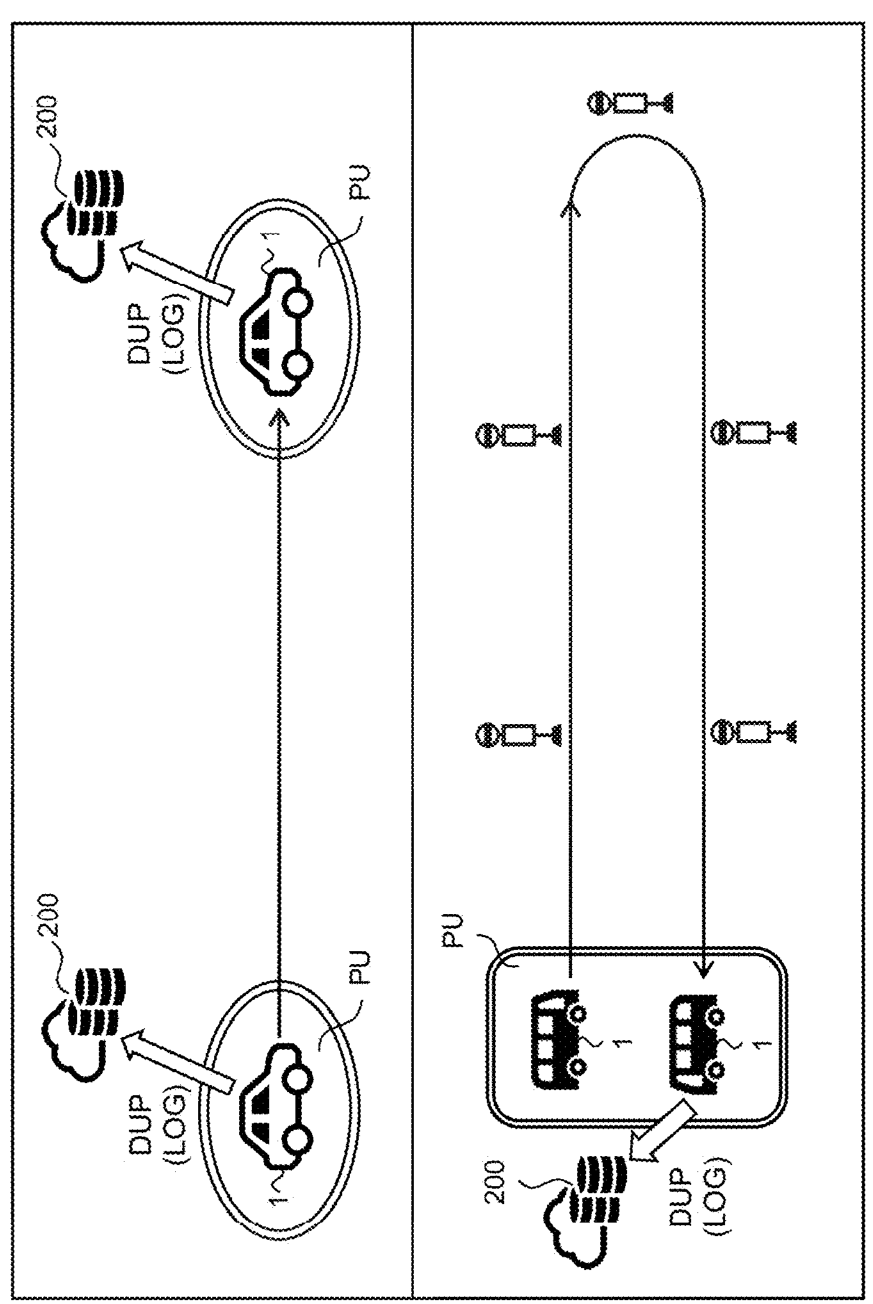
FIG. 3 is a conceptual diagram for explaining an upload position according to an embodiment.

FIG. 3 is a conceptual diagram for explaining an upload position PU. The upload position PU is a position where at least a part of the upload target data DUP stored in the storage device 120 of the vehicle 1 is uploaded to the management server 200. Typically, the upload position PU is predetermined. For example, the upload position PU is a destination of the vehicle 1. As another example, the upload position PU may be an intermediate point located between a point of departure point and a destination. The upload position PU may be home of the vehicle 1. For example, in a case where the vehicle 1 is a mobility service vehicle such as a bus, the upload position PU may be a hub (for example, a bus center) of the mobility service vehicles. The upload position PU is registered in the map information in advance.

Typically, the vehicle 1 stops at the upload position PU. At the upload position PU, the processor 110 may temporarily suspend the automated driving control. At the upload position PU, the processor 110 communicates with the management server 200 and uploads at least a part of the upload target data DUP to the management server 200. The processor 110 may upload all of the upload target data DUP to the management server 200. The processor 110 may delete the log data LOG uploaded to the management server 200 from the local storage device 120.

The log data LOG included in the upload target data DUP are used for the assessment and the like of the automated driving control that uses the machine learning model. It is desirable that at least minimum required log data LOG for the assessment and the like are stored in the local storage device 120 of the vehicle 1 and then uploaded to the management server 200. However, a capacity of the storage device 120 of the vehicle 1 is limited. In consideration of that, it is desirable to avoid such a situation where even the minimum required log data LOG cannot be stored. Meanwhile, it is also desirable to effectively utilize the capacity of the storage device 120 of the vehicle 1.

In view of the above, the present embodiment proposes a technique capable of appropriately storing the log data LOG in the storage device 120 of the vehicle 1.

2-1. First Example

Figure 4:
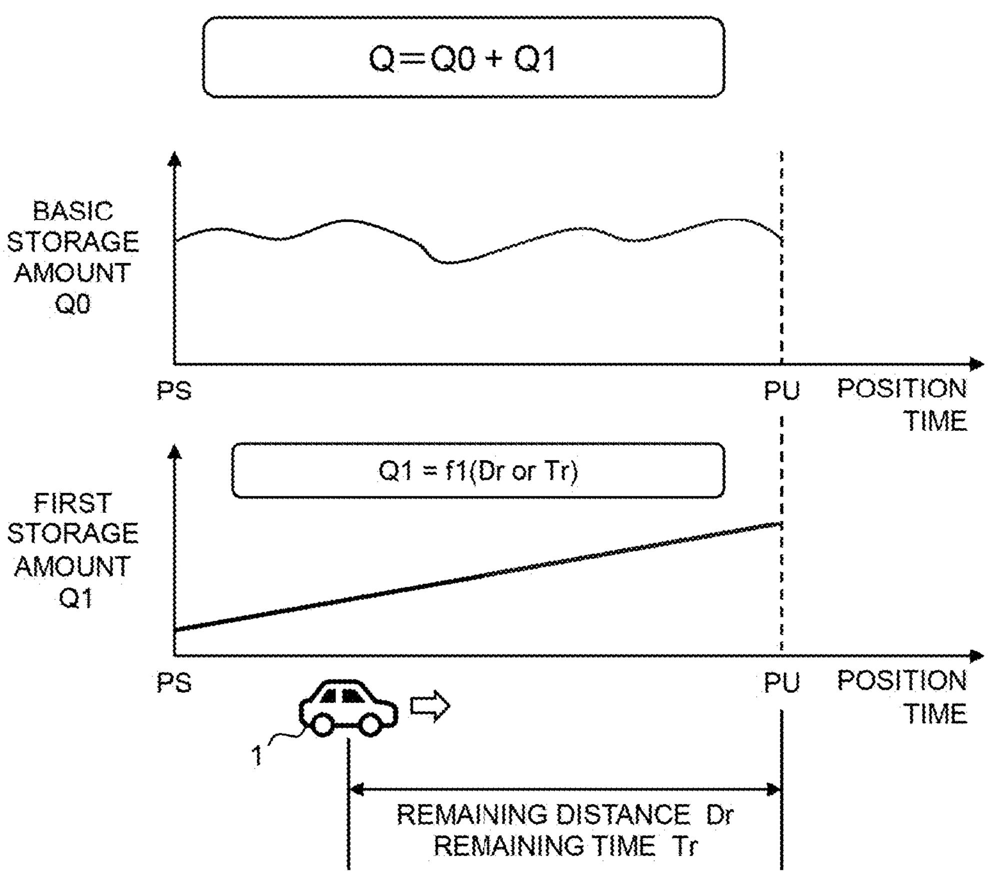
FIG. 4 is a conceptual diagram for explaining a first example of a log data storing process according to an embodiment.

FIG. 4 is a conceptual diagram for explaining a first example of the log data storing process. The vehicle 1 moves from a departure point PS to the upload position PU. A horizontal axis in FIG. 4 represents a position between the departure point PS and the upload position PU or a time corresponding to the position.

An amount of the upload target data DUP stored in the storage device 120 per unit time or unit distance is hereinafter referred to as a “target storage amount Q.” That is, the processor 110 stores the upload target data DUP of the target storage amount Q in the storage device 120 per unit time or unit distance. In the first example, the target storage amount Q includes a "basic storage amount Q0" and a "first storage amount Q1."

The basic storage amount Q0 is an amount of predetermined log data LOG that are minimum required for the assessment and the like. Contents of the minimum required predetermined log data LOG are specified in advance by, for example, an administrator of the automated driving system 100 or the management server 200. For example, the minimum required predetermined log data LOG include the sensor detection information SEN and the control amount CON. The basic storage amount Q0 may vary depending on a position, time, surrounding environment, a scene, and the like.

On the other hand, the first storage amount Q1 is an amount of "additional data" other than the minimum required predetermined log data LOG. For example, the additional data include additional log data LOG other than the minimum required predetermined log data LOG. As another example, the additional data may include training data to be used for training of the machine learning model. The training data include data related to the automated driving control using the machine learning model in the vehicle 1. The training data may be a combination of input data that are input into the machine learning model and output data that are output from the machine learning model. It should be noted that the training data may be used for training (updating) of the machine learning model used for the automated driving control of the said vehicle 1, or may be used for training of another machine learning model. As still another example, the additional data may include data that are not directly related to the automated driving control.

The upload target data DUP stored in the storage device 120 per unit time or unit distance include "the predetermined log data LOG of the basic storage amount Q0" and "the additional data of the first storage amount Q1." Storing not only the predetermined log data LOG but also the additional data in the storage device 120 makes it possible to effectively utilize the capacity of the storage device 120.

However, the basic storage amount Q0 may vary depending on a position, time, surrounding environment, a scene, and the like. It is not always easy to predict the basic storage amount Q0. If a free space on the storage device 120 is consumed without planning from the beginning, the free space on the storage device 120 may be depleted later. If the free space on the storage device 120 is depleted, even the minimum required predetermined log data LOG may not be stored in the storage device 120.

In view of the above, the first storage amount Q1 is set in consideration of a remaining distance Dr or a remaining time Tr to the upload position PU. In other words, the first storage amount Q1 is expressed as a function (f1) of the remaining distance Dr or the remaining time Tr to the upload position PU. The remaining distance Dr can be calculated based on a current position of the vehicle 1 and the upload position PU. The current position of the vehicle 1 is obtained by the position sensor 13. The upload position PU is registered in the map information in advance. The remaining time Tr can be estimated from the remaining distance Dr and the speed of the vehicle 1. The speed of the vehicle 1 is detected by the state sensor 12. Alternatively, when the vehicle 1 is a mobility service vehicle such as a bus and the like, the remaining time Tr to the upload position PU is obtained from an operation schedule of the mobility service vehicles.

More specifically, as shown in FIG. 4, the first storage amount Q1 increases as the remaining distance Dr or the remaining time Tr to the upload position PU decreases. The increase may be a monotonic increase or may be a stepwise increase. For example, a travel route of the vehicle 1 from the departure point PS to the upload position PU includes a first section and a second section following the first section. In this case, the first storage amount Q1 in the second section is set to be larger than the first storage amount Q1 in the first section. In a case where a mobility service vehicle departs from a certain hub (e.g., a bus center) and returns back to the same hub, the first section may be an outbound section and the second section may be a return section. The first storage amount Q1 in the first section may be set to zero.

The additional data may be additional log data LOG other than the minimum required predetermined log data LOG. In this case, for example, the number of types of log data LOG stored in the storage device 120 increases as the remaining distance Dr or the remaining time Tr to the upload position PU decreases. As another example, a sampling rate of the log data LOG may increase as the remaining distance Dr or the remaining time Tr to the upload position PU decreases.

A profile of the first storage amount Q1 as illustrated in FIG. 4 may be set in advance by the administrator of the automated driving system 100 or the management server 200.

As described above, according to the first example, the target storage amount Q per unit time or unit distance includes the first storage amount Q1. The first storage amount Q1 increases as the remaining distance Dr or the remaining time Tr to the upload position PU decreases. At an early stage where the remaining distance Dr or the remaining time Tr is long, the first storage amount Q1 is set to be small (moderate). This can suppress such a situation where the free space on the storage device 120 is depleted at the early stage. That is to say, it is possible to suppress such a situation where even the minimum required predetermined log data LOG cannot be stored in the storage device 120.

On the other hand, as the remaining distance Dr or the remaining time Tr to the upload position PU decreases, the first storage amount Q1 increases and thus the additional data stored in the storage device 120 becomes richer. This makes it possible to store more useful data. That is to say, it is possible to effectively utilize the capacity of the storage device 120.

As described above, according to the first example, it is possible to appropriately store the log data LOG related to the automated driving control while effectively utilizing the capacity of the storage device 120.

2-2. Second Example

Figure 5:
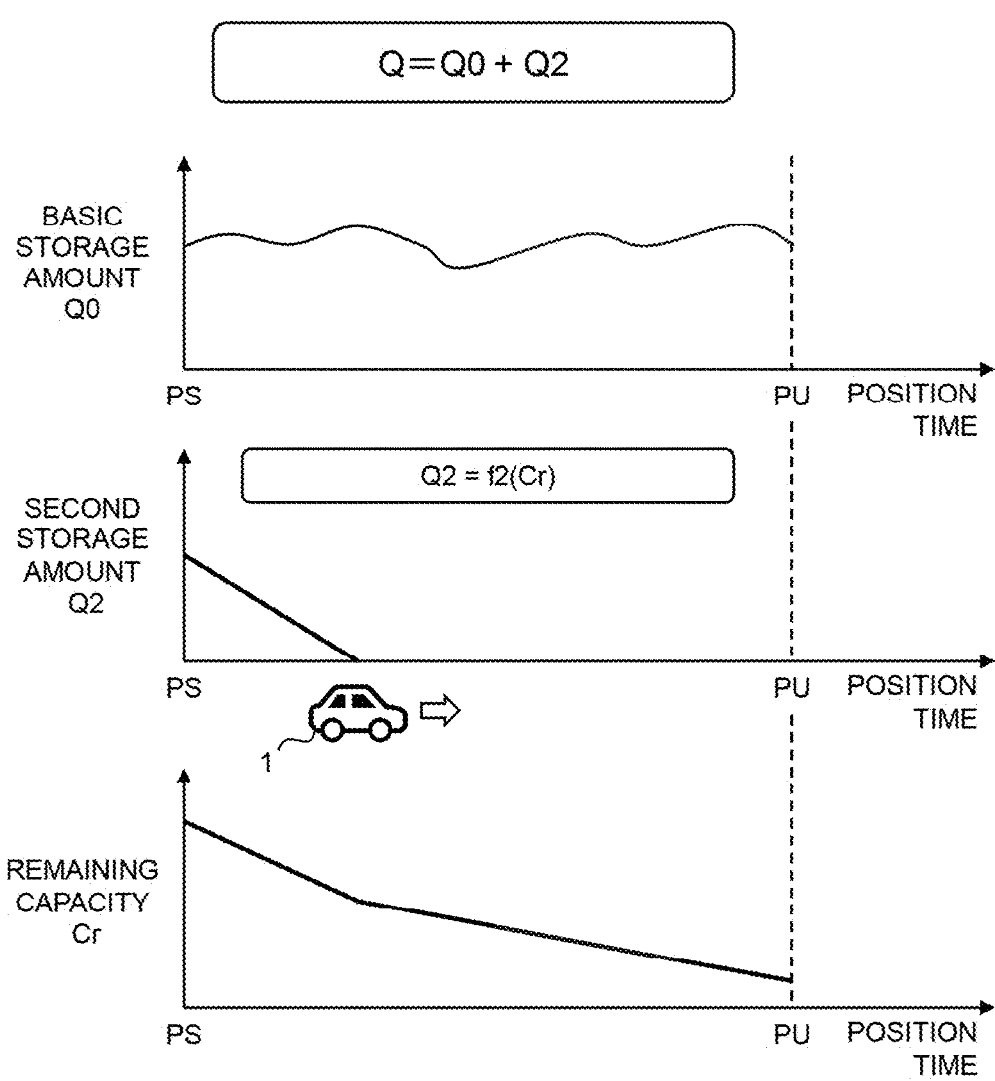
FIG. 5 is a conceptual diagram for explaining a second example of a log data storing process according to an embodiment.

FIG. 5 is a conceptual diagram for explaining a second example of the log data storing process. A description overlapping with the first example described above will be omitted as appropriate. In the second example, the target storage amount Q includes the "basic storage amount Q0" and a "second storage amount Q2."

As in the case of the first storage amount Q1, the second storage amount Q2 also is an amount of "additional data" other than the minimum required predetermined log data LOG. The second storage amount Q2 is set in consideration of a remaining capacity Cr of the storage device 120. In other words, the second storage amount Q2 is expressed as a function (f2) of the remaining capacity Cr of the storage device 120. More specifically, the second storage amount Q2 decreases as the remaining capacity Cr of the storage device 120 decreases. The decrease may be a monotonic decrease or may be a stepwise decrease. As shown in FIG. 5, the second storage amount Q2 may become zero at a stage where there is still a sufficient remaining capacity Cr. For example, when the remaining capacity Cr becomes less than a predetermined threshold value, the second storage amount Q2 is set to zero. A profile of the second storage amount Q2 may be set in advance by the administrator.

At a stage where the remaining capacity Cr of the storage device 120 is relatively large, the second storage amount Q2 is set to be relatively large and thus the additional data stored in the storage device 120 becomes rich. This makes it possible to store more useful data. That is to say, it is possible to effectively utilize the capacity of the storage device 120.

On the other hand, when the remaining capacity Cr of the storage device 120 becomes relatively small, the second storage amount Q2 becomes small. This can suppress such a situation where the free space on the storage device 120 is depleted. That is to say, it is possible to suppress such a situation where even the minimum required predetermined log data LOG cannot be stored in the storage device 120.

As described above, according to the second example, it is possible to appropriately store the log data LOG related to the automated driving control while effectively utilizing the capacity of the storage device 120.

2-3. Third Example

Figure 6:
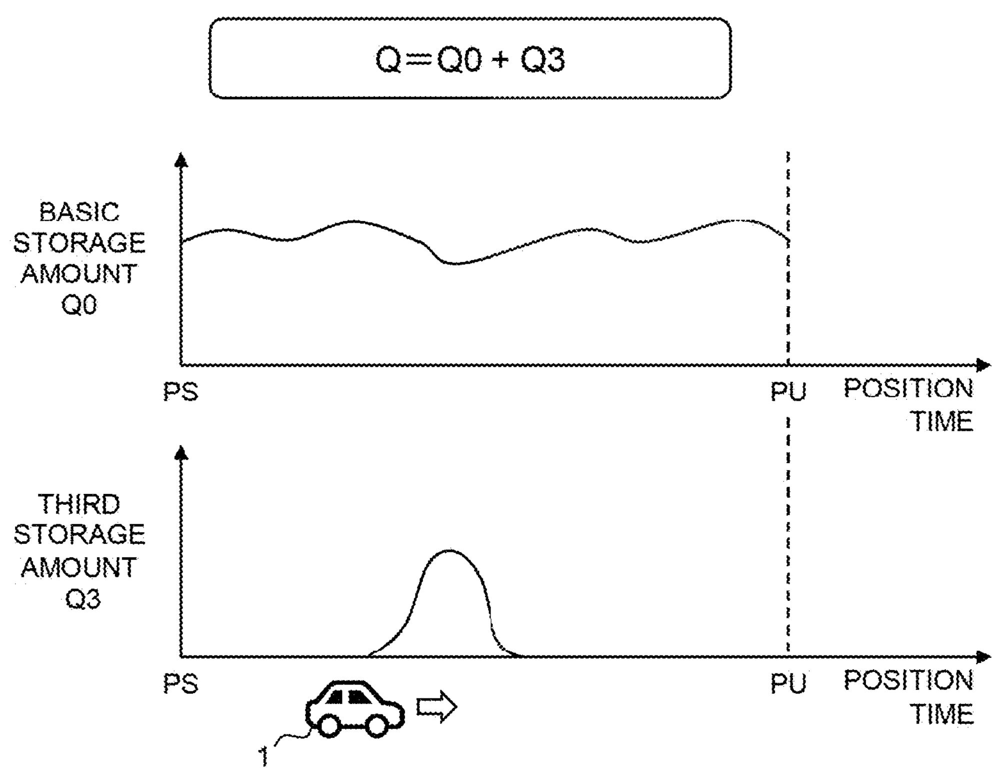
FIG. 6 is a conceptual diagram for explaining a third example of a log data storing process according to an embodiment.

FIG. 6 is a conceptual diagram for explaining a third example of the log data storing process. A description overlapping with the first example described above will be omitted as appropriate. In the third example, the target storage amount Q includes the "basic storage amount Q0" and a "third storage amount Q3."

As in the case of the first storage amount Q1, the third storage amount Q3 also is an amount of "additional data" other than the minimum required predetermined log data LOG. The third storage amount Q3 is secured in a pinpoint manner at a position specified by the administrator. For example, the administrator specifies a position (for example, an intersection) where an event is likely to occur. The third storage amount Q3 may be a predetermined amount or may be specified by the administrator. A profile of the third storage amount Q3 may be set in advance by the administrator.

The third example also makes it possible to appropriately store the log data LOG related to the automated driving control while effectively utilizing the capacity of the storage device 120.

2-4. Fourth Example

A combination of two or more of the first to third examples described above is also possible. For example, the third example may be combined with the first example or the second example. For example, the third storage amount Q3 may be set in a pinpoint manner at a position where the first storage amount Q1 or the second storage amount Q2 is sparse. A combination of the first example, the second example, and the third example is also possible.

What is claimed is:

1. An automated driving system installed on a vehicle and comprising:

processing circuitry; and one or more storage devices, wherein the processing circuitry is configured to: perform at least a part of automated driving control of the vehicle by using a machine learning model; acquire, during execution of the automated driving control, target data including log data related to the automated driving control that uses the machine learning model; and store the target data of a target storage amount in the one or more storage devices per unit time or unit distance, wherein:

the target data includes minimum required predetermined log data and additional data other than the predetermined log data, the processing circuitry is further configured to store the additional data of a first storage amount in the one or more storage devices, an upload position is a position where at least a part of the target data stored in the one or more storage devices is uploaded to an external device, and the first storage amount is set to increase as a remaining distance or a remaining time to the upload position decreases.

2. The automated driving system according to claim 1, wherein the additional data include training data that are related to the automated driving control using the machine learning model and are to be used for training of the machine learning model or another machine learning model.

3. The automated driving system according to claim 1, wherein the target storage amount further includes a second storage amount that decreases as a remaining capacity of the one or more storage devices decreases.

4. The automated driving system according to claim 1, wherein the target storage amount further includes a third storage amount that is secured at a position specified by an administrator.

5. The automated driving system according to claim 1, wherein a travel route of the vehicle from a departure point to the upload position includes a first section and a second section following the first section, and the first storage amount in the second section is set to be larger than the first storage amount in the first section.

6. The automated driving system according to claim 1, wherein the processing circuitry is further configured to:

acquire map information in which the upload position is registered;

calculate the remaining distance to the upload position based on the upload position registered in the map information and a current position of the vehicle; and calculate the remaining time to the upload position based on the remaining distance and a speed of the vehicle.

7. The automated driving system according to claim 1, wherein the vehicle is a bus, and the processing circuitry is further configured to obtain the remaining time to the upload position based on an operation schedule of the bus.

* * * * *